(12) United States Patent
Verdillon

(10) Patent No.: US 6,752,436 B1
(45) Date of Patent: Jun. 22, 2004

(54) FATIGUE-RESISTANT THREADED BEVELLED TUBULAR ELEMENT

(75) Inventor: Lionel Verdillon, Dommartin (FR)

(73) Assignees: Vallourec Mannesmann Oil & Gas France, Aulnoye-Aymeries (FR); Sumitomo Metal Industries, Ltd, Osaka (JP)

(*) Notice: Subject to any disclaimer, the term of this patent is extended or adjusted under 35 U.S.C. 154(b) by 0 days.

(21) Appl. No.: 09/926,675

(22) PCT Filed: Mar. 26, 2001

(86) PCT No.: PCT/FR01/00913
§ 371 (c)(1),
(2), (4) Date: Mar. 15, 2001

(87) PCT Pub. No.: WO01/75345
PCT Pub. Date: Oct. 11, 2001

(30) Foreign Application Priority Data

Mar. 31, 2000 (FR) .............................. 00 04137

(51) Int. Cl.⁷ .............................................. F16L 25/00
(52) U.S. Cl. ...................................... 285/333; 285/390
(58) Field of Search ............................... 285/333, 334, 285/390, 355

(56) References Cited

U.S. PATENT DOCUMENTS

| | | | | | |
|---|---|---|---|---|---|
| 2,992,613 A | * | 7/1961 | Bodine | | 285/333 |
| 3,100,657 A | * | 8/1963 | Pistole et al. | | 285/333 |
| 3,497,246 A | * | 2/1970 | Weiner | | 285/333 |
| 4,688,828 A | * | 8/1987 | Shaffer | | 285/333 |
| 4,796,923 A | * | 1/1989 | Liggins et al. | | 285/334 |
| 4,846,508 A | * | 7/1989 | Pallini, Jr. et al. | | 285/334 |
| 5,355,968 A | | 10/1994 | Smith | | |
| 6,237,967 B1 | * | 5/2001 | Yamamoto et al. | | 285/333 |
| 6,494,499 B1 | * | 12/2002 | Galle, Sr. et al. | | 285/334 |

FOREIGN PATENT DOCUMENTS

| | | |
|---|---|---|
| EP | 0 032 265 | 7/1981 |
| FR | 1 317 815 | 1/1963 |
| JP | 58-187684 | 11/1983 |
| WO | WO 00/06936 | 2/2000 |

* cited by examiner

Primary Examiner—Lynne H. Browne
Assistant Examiner—Aaron Dunwoody
(74) Attorney, Agent, or Firm—Oblon, Spivak, McClelland, Maier & Neustadt, P.C.

(57) ABSTRACT

A fatigue resistant waisted threaded tubular element for threaded tubular connection, and resulting threaded tubular connection. The threaded tubular element is waisted by a groove formed in the material beneath the threading to reduce the stiffness of the wall at the level of the first engaging threads. The groove can prevent an increase in the transfer of tensile loads at the level of the first engaging threads of the threaded element on which it is formed and on the corresponding last engaging threads of the mating threaded element intended to be connected thereto to form a threaded tubular connection. This improvement in load transfer limits the risk of initiating a fatigue crack in threaded tubular connections subjected to a cyclic load without reducing their static performances.

26 Claims, 7 Drawing Sheets

FATIGUE-RESISTANT THREADED BEVELLED TUBULAR ELEMENT

BACKGROUND OF THE INVENTION (1) Field of the Invention

The present invention relates to a male or female threaded tubular element of a threaded tubular connection which is particularly capable of resisting both static and cyclic stresses.

The present invention also relates to a threaded tubular connection which is particularly suitable for resisting both static and cyclic stresses.

(2) Description of Related Art

Threaded tubular connections comprise a male threaded element at the end of a first pipe and a female threaded element at the end of a second pipe which may be a great length pipe or a coupling. Such threaded connections are used in particular to constitute casing strings or production strings or drillpipe strings for hydrocarbon wells or for similar wells such as for example geothermal wells.

In its API specification 5B, the American Petroleum Institute (API) defines threaded connections between casing pipes or between production pipes in particular with tapered threadings with trapezoidal or round triangular threads.

Other types of threaded connections are also known which use straight or tapered two-step thread: see, for example, U.S. Pat. Nos. 4,521,042 and 5,687,999.

Until recently, casing pipes or production pipes had essentially to be capable of resisting different combinations of static stresses (tension, axial compression, plane bending, internal or external pressure) despite their limited thickness resulting from the need, to be able to exploit a deep well, to insert a variety of columns of different diameters one into another.

In contrast, drillpipes, which are only used to drill wells, are subjected to substantial cyclic stresses (dynamic ones) but are not subjected to size limitations, since a single string of a given diameter is downhole at a given time.

If not strictly limited, cyclic stresses lead during operation to fatigue ruptures which start at the thread roots, generally on the side of the load flanks which are beneath load in operation, more particularly at the last engaging threads of each of the threaded elements of the drillpipes.

In the remainder of the present document, the term "first threads" means the threads which, in a longitudinal cross section passing through the axis of the threaded element, are located on the free end side of the threaded element. As a result, the last threads are those located at the other end of the threading.

The term "engaging threads" firstly means the threads of a threaded tubular connection which transfer the load from one threaded tubular element to the mated threaded tubular element.

When the threaded connection is subjected to tensile loads, the engaging threads are those where the load flanks are in contact and transfer the load from one threaded element to the mated threaded element.

By extension, the term "engaging threads of a threaded tubular element" as used in the present document means the threads intended to transfer the load to the corresponding threads of a mated threaded tubular element when these two threaded tubular elements are connected to constitute a threaded tubular connection.

The position of the engaging threads of a threaded tubular element is known from the design of the threaded element. This is a theoretical factor defined by the nominal dimensions of the threaded elements to be connected.

The position of the last or first engaging threads can thus be perfectly defined for a threaded tubular element intended for a threaded connection.

However the problem of fatigue behavior is now not only encountered in drillpipes but also for production pipe strings for certain hydrocarbon wells.

The threaded tubular connections which enable such strings to be produced must be capable of tolerating both high static stresses and cyclic stresses.

Such demands on stress behavior are now being encountered in underwater strings connecting the seabed to offshore hydrocarbon exploitation platforms.

Such columns of pipes, known to the English-speaking skilled person as "risers", are indeed subjected to cyclic stresses caused in particular by currents which induce vibrations in the column, by waves, by tides and by possible displacement of the platforms themselves, all stresses which induce mainly cyclic bending stresses and/or tension-compression stresses.

Such demands on stress behavior are also encountered in onshore wells, in particular when dropping rotating pipes in order to cement wells in the very frequent case of wells which deviate from the vertical and have bends; the rotating dropping produces then a rotative bending.

For this reason, improvements to threaded tubular connections for casing pipes, for production pipes or for risers have been sought in order to increase their fatigue strength.

The prior art for threaded tubular or non-tubular connections (screw-nut type, for example) proposes means for improving the fatigue strength of threaded connections subjected to axial tensile loads which can vary cyclically.

patent application WO 00/06931 describes a female threaded element for a threaded tubular connection the outside peripheral surface of which is tapered and has a diameter which decreases as the female free end gets nearer so that the material thickness beneath the threading is reduced at the level of the first threads. There results a great sensitiveness to shocks of the female free end, which is very slim.

Many documents, including U.S. Pat. No. 5,779,416 and patent applications JP 04 157 280 and JP 04 157 283, use a groove in the form of a U beyond the last male engaging threads in the non threaded portion under tension of the male threaded element. Such a groove has the major disadvantage of reducing the critical cross section of the threaded connection which is the most stressed under axial tension and consequently of reducing the tensile static performances of the threaded connection.

U.S. Pat. No. 3,933,074 describes a nut for a bolted connection where the internal threading is interrupted at the first engaging threads by a plurality of axial channels in hollow regularly disposed on the periphery of the threading in order to displace the maximal transfer zone for axial tensile stress between the screw and nut from the first female engaging thread towards the middle of the axial length of the bolt.

Those channels the length of which can reach half the length of the threading and the depth of which can reach up to 80% of the height of the thread, increase the flexibility of the first engaging threads but reduce by about 20% the bearing surface of the threads in the zone where they are produced, which is a disadvantage when a high resistance to static stress is sought and when a threaded tubular connection is sought the interior and exterior of which are sealed.

Moreover, solutions as regard bolts in which the nuts are bearing on the side of the first threads against the screw casing-head (on the side of the last threads of the screw) are not necessarily directly applicable to threaded tubular connections.

Patent FR 1 317 815 describes an annular groove with the profile of a basin comparatively not very deep formed on the external peripheral surface of a female threaded element of a drill pipe.

BRIEF SUMMARY OF THE INVENTION

In the figures of this patent, the groove is disposed in the middle of the threading and has no effect on the wall at the level of the first or last threads. It enables to spread out the concentrations of stresses on the whole of the male threading while increasing the stresses at the level of the threads which are situated beneath the groove about the middle of the threading.

Nevertheless this patent does not tell to which stresses the stress fields shown in the figures (torsion, tension, compression, bending) correspond. They seem to be stresses simply resulting from the made up state of the threaded elements of the drillpipes.

It will also be noted, still in the figures of this patent, that the groove has a flat bottom parallel to the axis of the threaded connection and steep flanks, which are roughly perpendicular with respect to the groove bottom and to the external peripheral surface.

Patent applications JP 58-187684 and EP 0 032 265 describe a male threaded element which is provided with an annular groove with a basin profile formed on the internal peripheral surface of the threaded element at the level of the non-threaded lip at a free end or essentially formed at the level of said lip.

In those two documents, a lip has been provided for improving other characteristics of a threaded tubular connection than fatigue strength (galling strength, stress corrosion strength, locking of the threaded elements in position) and in those two documents nothing suggests that a groove formed under the male lip (and possibly slightly protruding under the first two male threads in the case of the Japanese document) might improve fatigue strength of a threaded tubular connection.

The aim of the present invention is to produce a male or female threaded tubular element for threaded tubular connections, which is particularly resistant both to:

a) static stresses, in particular axial tension, axial compression, bending, torsion, internal or external pressure, dislodging during connection, either simple or combined (for example tension+internal pressure);

b) cyclic stresses, in particular bending stresses and tension-compression stresses.

In the remainder of the present document, such a threaded element will be described as having an anti-fatigue profile.

The present invention also aims to ensure that the threaded tubular element of the invention can be formed with all types of threadings: tapered, straight, straight-tapered combinations, with one or more steps, with trapezoidal or triangular threads, which may be interfering or non-interfering; non interfering threadings can be, for example, of the type described in European patent application EP 0 454 147 with simultaneous contact of the two flanks with those of the mated thread (known as "rugged thread"), with an axial interference fit of the type described in document WO 00/14441, or of the wedge type with a varying width as described, for example, in US Re 30 647.

A further aim is that the threaded element can be produced and inspected easily.

The threaded element of the invention must be able to be used to constitute threaded connections for strings of hydrocarbon production pipes, for well casings or for underwater exploitation "risers" or for similar uses.

A still further aim is to produce threaded tubular connections which are sealed, in particular gas tight, even under cyclic stresses.

In a variation, the threaded element of the invention must be able to be used in drillpipe strings.

A still further aim is to produce a threaded tubular connection in which only one of the threaded elements, for example the female element, has been modified to resist cyclic stresses but which accommodates a non-modified mated threaded element.

In a variation, both threaded tubular elements of the threaded tubular connection have been modified to resist cyclic stresses.

The male or female threaded tubular element with an anti-fatigue profile is formed at the end of a pipe and comprises a male threading on its external peripheral surface or a female threading on its internal peripheral surface depending on whether the threaded tubular element is of the male type or of the female type.

Said threaded tubular element is intended for a connection by screwing to a mating type threaded tubular connection (i.e., female if the threaded element beneath consideration is male and vice versa) to constitute a threaded tubular connection capable of resisting both static and cyclic stresses.

This threaded tubular element comprises a means which increases the flexibility of the first engaging threads and which thus aims at reducing the load transfer between the first engaging threads of the threaded tubular element and the last engaging threads of a mated threaded tubular element when these two elements form a threaded tubular connection subjected to tensile loads.

This means comprises a waist in the form of a groove on the wall of the threaded element starting from the peripheral surface opposite to that where the threading is formed. The groove does not affect the geometry of the threads, being formed between the envelope of the thread roots and the peripheral surface opposite that of the threading.

It has been formed in correspondence with the threading.

In accordance with the invention, the groove is such that, at the level of the first engaging threads, the thickness of the wall beneath the threading, i.e. the thickness of the wall measured starting from the thread root is reduced by the groove.

The function of this groove is to reduce the stiffness of the wall beneath the threading at the level of the first engaging threads, the stiffness of the wall varying with the stiffness of the wall beneath the threading.

Such a reduction in stiffness of the wall reduces the stiffness of the first engaging threads or increases their flexibility and thus reduces at their level the amount of the tensile load transfer. It there results a decrease in the stress peak at the level of the last engaging threads on a threaded element mated with the threaded element under consideration and made up in position with the latter so as to constitute a threaded tubular connection.

With a similar groove dimension, the inventor has established that the disposition of the groove according to the invention enables to optimize and ensure both static and dynamic (fatigue) operational characteristics of the threaded element under consideration when made up in position with a mated threaded element in a threaded tubular connection.

Preferably the groove starts beneath the first engaging thread of the threading.

Preferably the groove ends in an axial interval comprised between a cross section in the middle of the threading and a cross section situated at the level of the last engaging threads.

Preferably, the groove of the invention is a body of revolution around the axis of the threaded tubular element in the same transverse cross section. It thus reduces the stiffness circumferentially in the same manner around the threaded tubular element.

Preferably again, the groove of the invention reduces the stiffness of the wall which supports the threads perpendicularly thereunder in a varying but gradual manner in an axial direction of the threaded tubular element.

Such a disposition avoids a local concentration of stresses which may destroy the beneficial effect of reducing the stiffness of the structure on load transfer, and even initiate fatigue ruptures.

At the level of the groove of the invention, the thickness of the wall beneath the threading is minimum in a transverse plane preferably located in an interval between the first and sixth engaging threads.

Highly preferably, this minimum wall thickness beneath the threading is greater than or equal to the thread height and advantageously roughly equal to twice the thread height.

The idea to form such a deep groove is in opposition to the prevailing opinion which aims at reinforcing the ruggedness of the threaded elements taking into account their use in conditions often difficult on the drill sites and the stresses to be supported during operation in spite of a limited thickness.

Highly preferably again, the thickness of the wall beneath the threading at the level of the groove is minimum and constant on a non zero axial length.

Highly preferably again, because of the groove, the wall thickness beneath the threading is in the range 100% to 120% of the minimum thickness of the wall beneath the threading in a zone termed the "low stiffness zone"

This low stiffness zone is disposed around the transverse plane of minimum thickness of the wall beneath the threading and extends over an axial length equal to three or more times the thread pitch.

This enables a substantially maximum reduction in stiffness over an interval sufficient to allow for real variations in positioning of the first engaging threads with respect to the design because of the machining tolerances on the threaded tubular element.

Preferably, the profile of the groove is such that the critical section of the threaded element in axial efforts in particular tensile loads is located outside the waist. Preferably again, because of the groove, the thickness of the wall beneath the threading at the level of the last three engaging threads is in the range 80% to 100% of that of the non-waisted zone. The whole of the tensile load must in fact be absorbed by the critical cross section of the wall at the level of the last thread of the threading.

Preferably, the groove comprisesflanks the inclination of which with respect to the axis of the threaded tubular element is 45° or less.

Preferably, the groove flank directed towards the side of the free end of the threaded element is globally more inclined than the other groove flank with respect to the axis of the threaded element.

Preferably again, the profile of the groove is a curve constituted by a series of arcs of a circle with a finite or infinite radius joined tangentially to each other, the arcs of a circle with infinite radius corresponding to straight line segments.

Preferably again, the groove joins the current unhallowed portion of the peripheral surface in which it is formed via a tangential junction zone which is toric in shape.

In a variation, the groove can be partially or completely filled with a material with an elastic modulus which is lower than that of the threaded tubular element.

Preferably again, whatever the embodiment of the groove of the invention, the threads are trapezoidal in shape.

The invention also concerns a threaded tubular connection with high resistance to static and cyclic stresses, comprising a male threaded tubular element at the end of a first pipe connected by screwing to a female threaded tubular element at the end of a second pipe by means of a male threading on the male threaded tubular element and a female threading on the female threaded tubular element.

The term "pipe" means both a great length pipe and a short pipe such as a coupling.

Advantageously, at least one of the two male or female threaded tubular elements is of the type with the waist of the invention.

Highly advantageously from the viewpoint of performance under cyclic stresses, the two male and female elements are of the type with the waist of the invention.

Other advantages and characteristics of the invention will become clear from the detailed description below and from the accompanying drawings. This detailed description and accompanying drawings will not only serve to clarify comprehension of the invention but also contribute to the definition thereof, as appropriate.

BRIEF DESCRIPTION OF THE INVENTION

The Figures below are non-limiting descriptions of an embodiment and the use of threaded tubular elements and threaded tubular connections of the invention.

FIGS. 1 to 7 are longitudinal half cross sections passing through the axis of the threaded tubular element or threaded tubular connection beneath consideration.

FIG. 1 shows a female threaded tubular element of the invention.

FIG. 2 shows a prior art male threaded tubular element.

FIG. 3 shows a threaded tubular connection of the invention obtained by connecting the threaded elements of FIGS. 1 and 2.

FIG. 4 is a male threaded tubular element of the invention.

FIG. 5 shows a further threaded tubular connection of the invention obtained by connecting the threaded elements of FIG. 1 to 4.

FIG. 6 shows a threaded and coupled connection comprising two threaded tubular connections of the invention of the type shown in FIG. 3.

FIG. 7 shows a variation of the female threaded tubular element of the invention of FIG. 1.

Figure 1:
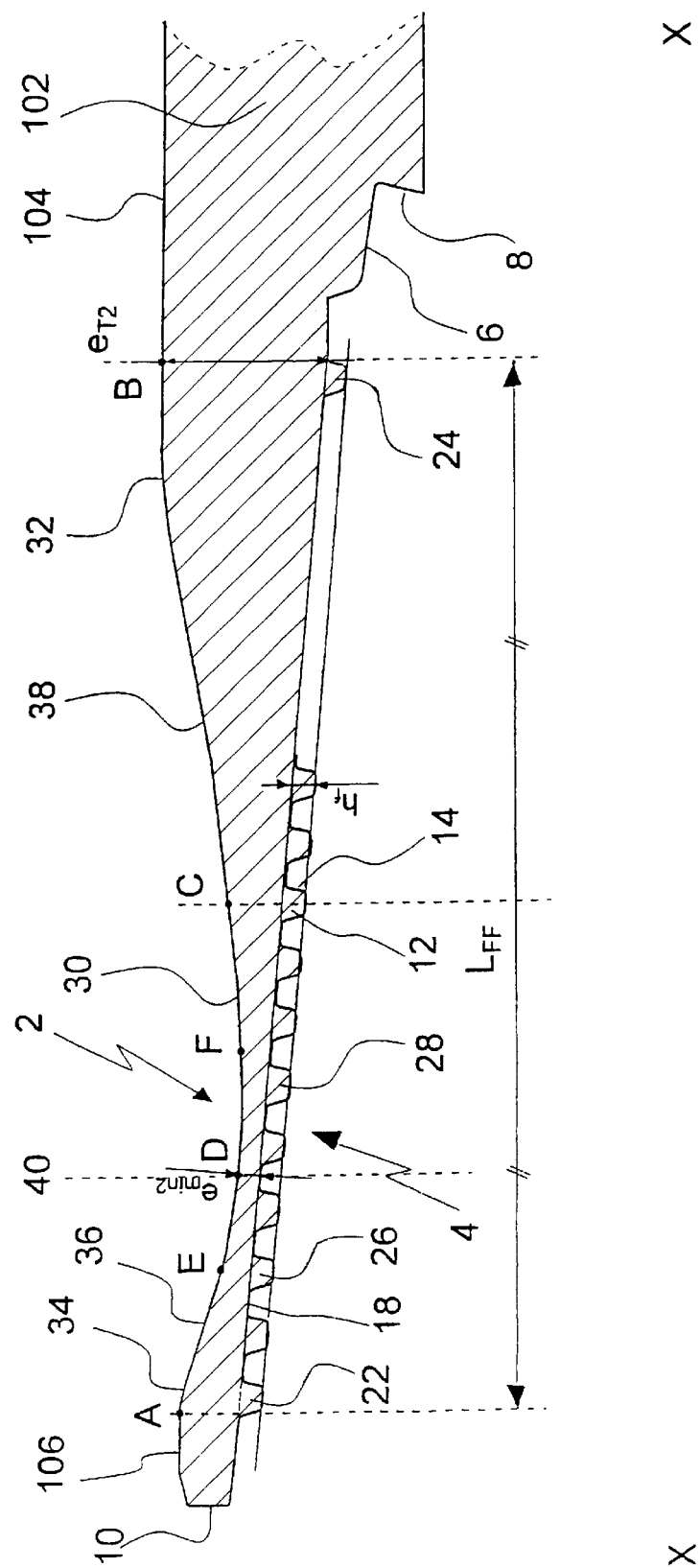

This male threaded element 1 is formed at the end of a pipe 101.

It comprises a male threading 3 constituted of a tapered threaded portion of length $L_{FM}$ machined on the external peripheral surface 105 of pipe 101.

Threads 11 of threading 3 are trapezoidal in shape. On the side opposite the free end 7 of threaded element 1, they have a load flank 13 which can transfer the load from one threaded element 3 to the mated threaded element 4 when these two threaded elements are connected to constitute a threaded tubular connection and are subjected to an axial tension.

The first thread 21 is that located on the side of the free end 7 of threaded element 1.

Thread 23 is the last thread of the threading and is a vanishing thread, i.e., a thread the crest of which is truncated by the outer peripheral surface 105 of pipe 101.

The threads 21 and 23 are respectively the first and last threads designed to engage with the corresponding threads of a female threaded tubular element on the connected threaded connection (see FIG. 3 below).

The inner peripheral surface 103 of threaded element 1, which is that opposite that 105 where the threading is formed, extends uniformly from the body of the pipe 101 to the free end 7 of the threaded element.

Figure 2:
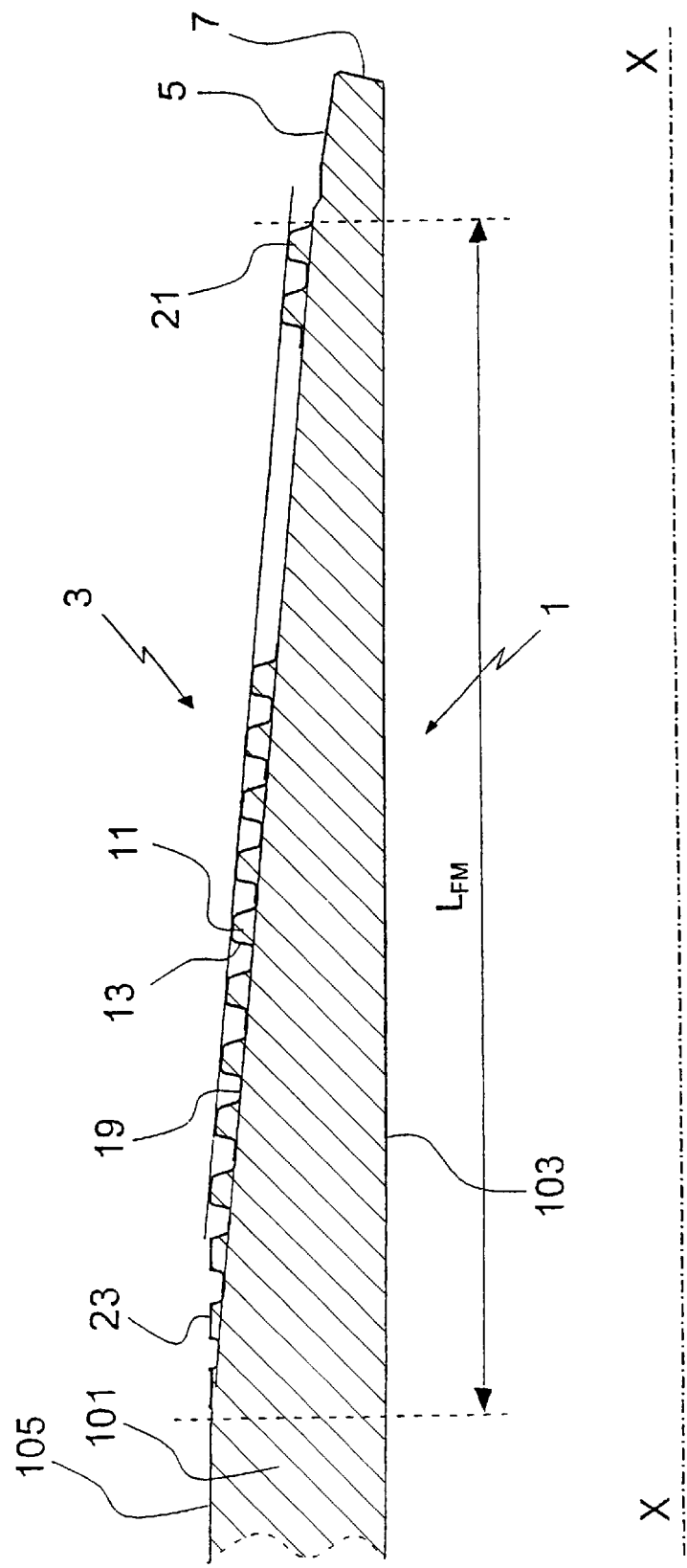
FIG. 2 shows a prior art male threaded tubular element 1.

FIG. 2 also shows an optional non-threaded lip disposed between the first thread 21 and the free end 7. This lip has a bearing surface 5 on its outer peripheral surface.

The wall beneath the threading is constituted by the wall material between the thread root 19 and the inner peripheral surface 103.

This wall is not infinitely rigid but has a stiffness, in particular an axial stiffness which is proportional to the thickness of the wall beneath the threading.

This stiffness varies very slightly from one end of the threading to the other because of the taper of the threading, but this variation is limited as the taper of the threading is low (6.25% in the case of "buttress" threadings in accordance with API specification 5B).

FIG. 1 shows a female threaded tubular element 2 of the invention.

Female threaded element 2 is formed at the end of a pipe 102.

It comprises a female threading 4 constituted of a tapered threaded portion of length $L_{FF}$ machined in the inner peripheral surface of pipe 102.

This female threading 4 mates with male threading 3 of male threaded element 1, i.e., they have the same thread pitch, the same taper, the same reference pitch diameter and the same thread shape.

Threads 12 of female threading 4 are also trapezoidal in shape. They comprise a load flank 14 mating with the load flank 13 of male threads 3.

The first thread is 22 disposed at the free end 10 side of threaded element 2 and the last thread is 24 disposed at the other end of the threading. They are also the first and last engaging threads as will be seen below.

The outer peripheral surface 104 is opposite the surface where threading 4 is formed.

This surface is hollowed or waisted in correspondence with threading 4 by a groove 30 with a very slightly inclined flank: flank 36 on the free end side is inclined at 15° and flank 38 is inclined at 9° with respect to axis XX of threaded element 2. Thus flank 36 is globally more inclined than flank 38 with respect to said axis.

Groove 30 significantly reduces the thickness of the material beneath the threading and thus the stiffness of the wall beneath the threading.

The reduction in thickness caused by the groove in the present case is more than 80% of the thickness of the wall beneath the threading measured at point B in the non waisted zone.

The groove starts at point A at the first engaging thread 22.

Because of the position of the groove, the stiffness of the wall of the threading at the first engaging threads (thread 22 and the three ones to the right thereof in FIG. 1) is reduced, which as a result increases the flexibility of the first engaging threads.

A groove which would start outside the threading on the side of the free end 10 would not be more efficient or would hardly be much more efficient as regards the strength resistance and would reduce the ruggedness of the free end 10.

A groove which would start further on beneath the threading could make a wall cross section critical for static stresses of axial tension beneath the threading at the level of the bottom of the groove D or slightly beyond whereas the normal critical section is the one beneath the last thread; it would then result in a deterioration of the static performances of the threaded connection, in particular under axial tension.

Groove 30 is a body of revolution about the axis of threaded tubular element 12.

The profile of groove 30 in longitudinal cross section is constituted by a series of arcs of a circle or straight lines which are tangential to each other so that the stiffness of the structure varies very gradually in an axial direction.

In particular, the profile of the groove bottom is constituted by arcs with a large radius which may even be infinite, thus corresponding to straight lines, which may, for example, be parallel to the taper of the threading.

The thickness of the wall beneath the threading is a minimum ($e_{min}$) at point D which is located between the $4^{th}$ and $5^{th}$ engaging threads. At point D in the transverse cross sectional plane 40, the stiffness of the wall beneath the threading is thus a minimum.

Advantageously, as indicated above, the groove bottom can follow over a small axial length, of the order of two thread pitches, a straight line with a slope identical to the taper of the threading so that the thickness of the wall beneath the threading and consequently the stiffness of the wall be minimum and constant over said axial length.

The thickness $e_{min2}$ measured perpendicular to the taper is equal to the thread height $h_f$.

The stiffness of the wall beneath the threading is almost minimum in a low stiffness zone located between points E and F where the thickness is only slightly higher than thickness $e_{min2}$: the thickness here is, for example, in the range 100% to 120% of the minimum thickness; the stiffness here varies in the same proportions with respect to the minimum value of the thickness.

The axial distance between points E and F is in the range 3 to 4 times the thread pitch, points E and F surrounding point D in plane 40 where the thickness and the stiffness are minimum.

Groove 30 ends at 32 on the side opposite free end 10, at the level of the last engaging threads. At B, just beyond the last engaging thread, the groove no longer exits.

The stiffness of the wall beneath the threading at the level of the last three engaging threads is thus almost not reduced with respect to that of the non waisted wall as the thickness of the wall beneath the threading at the level of the last engaging threads is in the range 80% to 100% of the thickness of the wall beneath the threading $e_{T2}$ at the non waisted zone (at B, for example). As a result, the critical section of threaded element 2 for axial tension stresses is the section at B which has not been reduced compared to the one of a similar threaded element but without a groove.

Groove 30 joins the outer peripheral unhollowed surface 104 of pipe 102 at 32 via a toric surface the profile of which is an arc of a circle in longitudinal cross section.

It also joins the free end side at 34, via a toric surface, to a cylindrical surface 106 with a diameter which is lower than that of surface 104 such that the thickness of the wall at A is reduced with respect to the thickness of the wall at B.

Note the optional presence of a transverse abutment surface 8 and a bearing surface 6 beyond threading 4 going towards the pipe body.

Figure 3:
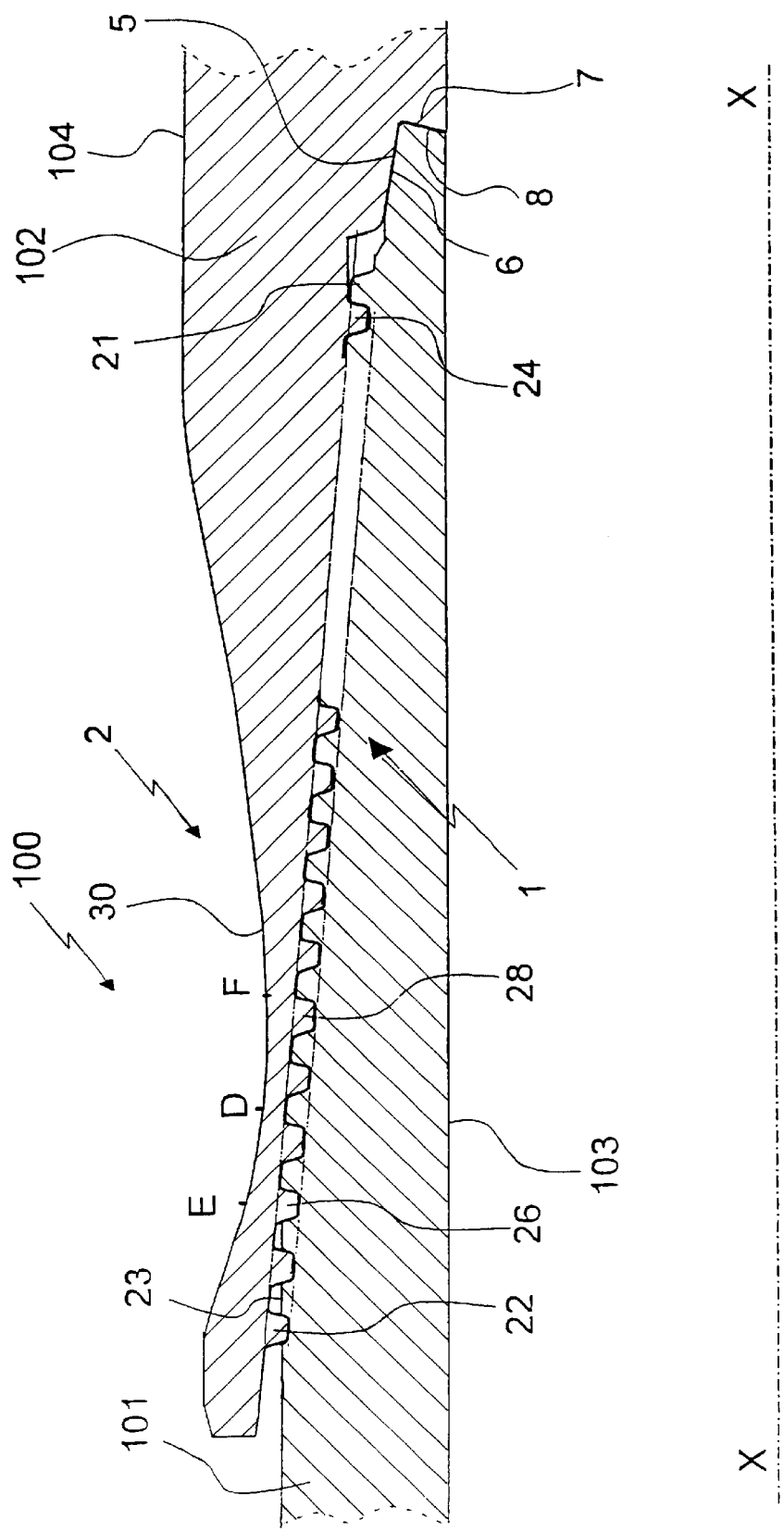

FIG. 3 shows the connection of the threaded elements of FIGS. 1 and 2 to form a threaded tubular connection 100. In this threaded connection 100, the male and female threadings 3, 4 of threaded elements 1 and 2 are made up, for example up to the point where optional transverse surfaces 7 and 8 of threaded elements 1 and 2 abut.

The optional bearing surfaces 5 and 6 are in contact under contact pressure and form a pair of metal-metal bearing sealing surfaces.

The threaded tubular connection 100 is subjected to axial tensile loads due, for example, to the weight of the pipes mounted vertically in the string in a well.

Moreover threaded connection 100 is, in the case shown in FIG. 3, subjected to axial tensile loads by the reaction of the transverse surfaces 7, 8 in abutment under a high torque of several kN.m which places load flanks 13, 14 under tension.

The critical section of threaded element 2 for axial tension stresses not being reduced compared to that of a similar threaded element but without a groove, the static performances of threaded element 100 for the axial tension stresses are unchanged compared to that of a threaded element in the prior art.

Cyclic forces may be superimposed on these static forces.

Each thread of a threading must transfer a portion of the tensile load to the corresponding thread of the mated threading.

This portion is not constant from one thread to another of the same threading and the role of the groove 30 on the female threaded element is to equilibrate the load transfer between the different threads, at least on the side of the first female engaging threads and the last male engaging threads in the case of FIG. 3.

Without this groove, load transfer will be much greater at the level of these threads. The last male threads will thus be subjected to large stresses further amplified by a geometrical stress concentration effect at the roots of these threadings in the junction radius between the load flank and thread root. By a combination of an excessive load transfer and of stress concentration, the junction radii are then the location where fatigue cracks start in threaded connections subjected to cyclic loads while such an increase in stresses in the case of static loads is incapable of leading to rupture.

The equilibration of load transfer obtained in the present invention by reducing the stiffness of the wall beneath the first female threads and the choice known per se of wide junction radii between load flanks 13, 14 and thread roots 19, 18 can sufficiently reduce the stresses in the critical zones to avoid the risk of fatigue rupture during operation, at the level of the last male engaging threads corresponding to the first female engaging threads.

It should be noted that in the absence of a groove on the male threaded element, load transfer remains unbalanced at the level of the first male engaging threads and the last female engaging threads but there are less often fatigue cracks initiated in those zones on the threaded connections of the prior art.

Finally, it should be noted that trapezoidal threads are preferably selected to avoid the risk of radial expansion of the female element at low stiffness zone EF when makeup is complete; such an expansion could cause catastrophic dislodging of threaded elements 1, 2 and cause the string to fall into the well.

Figure 5:
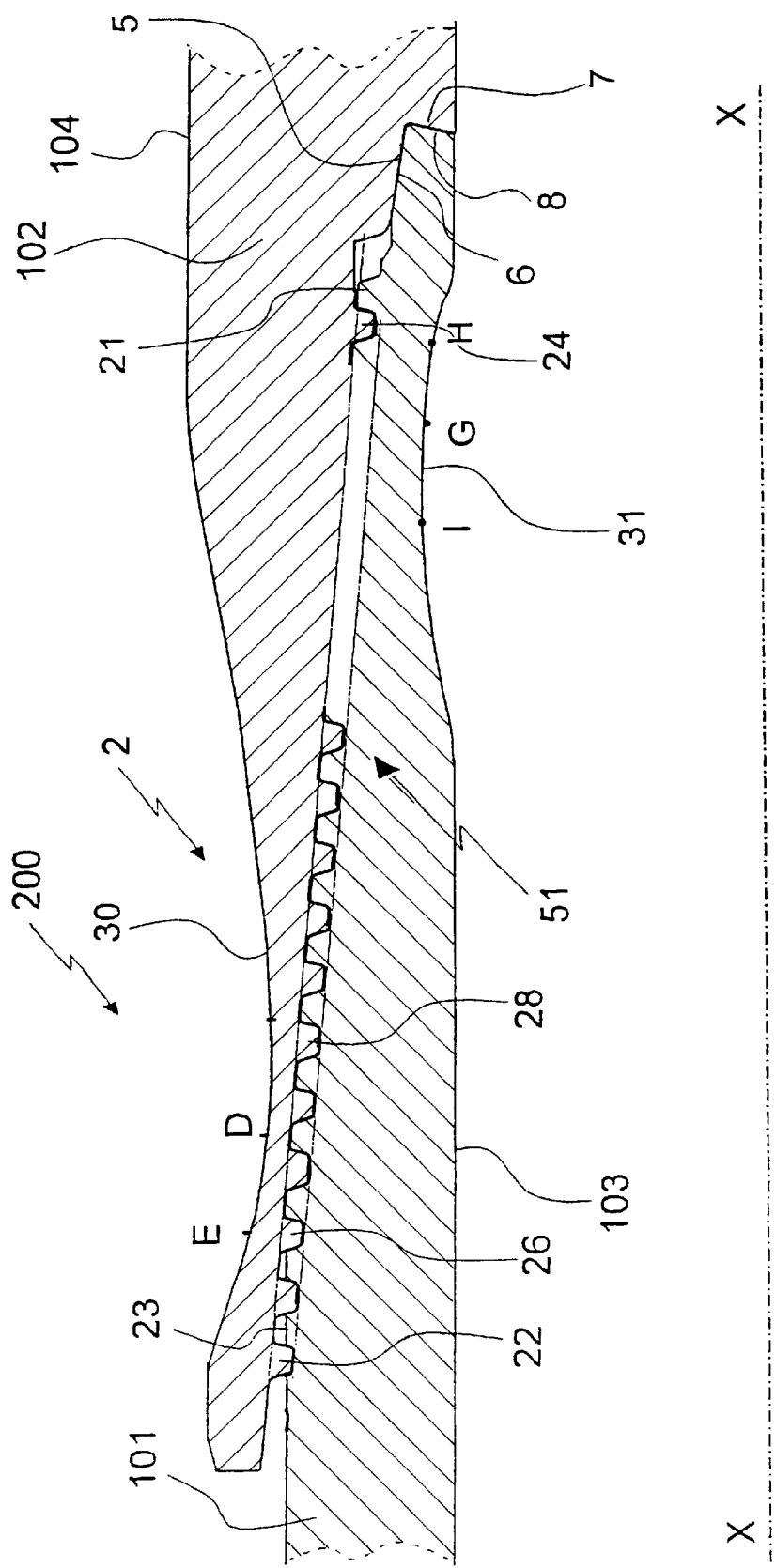

FIG. 5 shows a variation 200 of the threaded tubular connection of the invention in which each of the two elements, male and female, is provided with a groove.

The female threaded element 2 is thus identical to that of FIG. 1.

Figure 4:
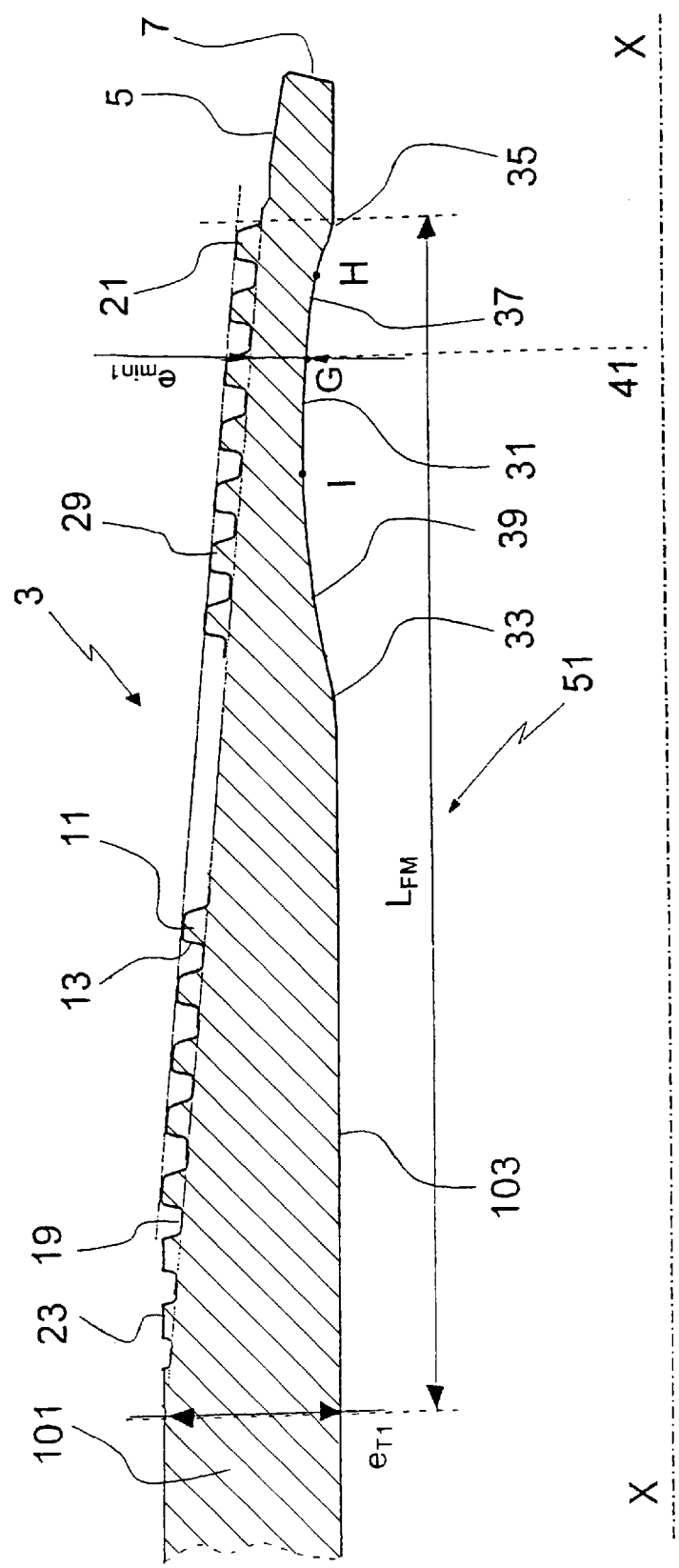

The male threaded element 51 is shown in FIG. 4.

Male threaded element 51 of this figure is derived from male threaded element 1 of FIG. 2 by hollowing a groove 31 in the inner peripheral surface 103 of this threaded element, this peripheral surface 103 being the surface opposite to the surface where male threading 3 is formed.

Groove 31 starts beneath the first thread 21 which is the first engaging thread (see FIG. 5) and ends towards the middle of the threading.

It reduces the stiffness of the wall beneath the threading at the level of the first male threads.

This reduction is a maximum at G located between the $2^{nd}$ and $3^{rd}$ male engaging threads, in plane 41 where the wall thickness beneath the threading is a minimum. This minimum thickness $e_{min2}$ is equal to about twice the thread height.

The reduction in stiffness is substantially maximal in a low stiffness zone between H and I, the axial distance between these two points being slightly more than three times the thread pitch.

Flanks 37, 39 of groove 31 are very little inclined; they join with the inner peripheral surface 103 of male threaded element 51 via toric surfaces at 33, 35.

Groove 31 itself has a profile constituted by a series of several arcs tangential to each other.

The radii of these arcs are high, in particular at the groove bottom.

Taking into account the profile and the disposition of groove 31, the critical section of threaded element 51 for axial tension stresses is that at the level of the last engaging thread 23. Said critical section is not reduced compared to that of a similar threaded element but without a groove.

The threaded connection 200 of FIG. 5 after making up in position of the male threaded element 51 in the female threaded element allows even better fatigue performance than that 100 of FIG. 3 since a groove has been formed in each of the elements and load transfer has been rendered uniform at the two ends of each element.

Its static performance for the axial tension stresses remains unchanged compared to that of the threaded connections of the prior art, the critical section of the threaded elements 2 and 51 not being reduced compared to that of the similar threaded elements but without a groove.

Figure 6:
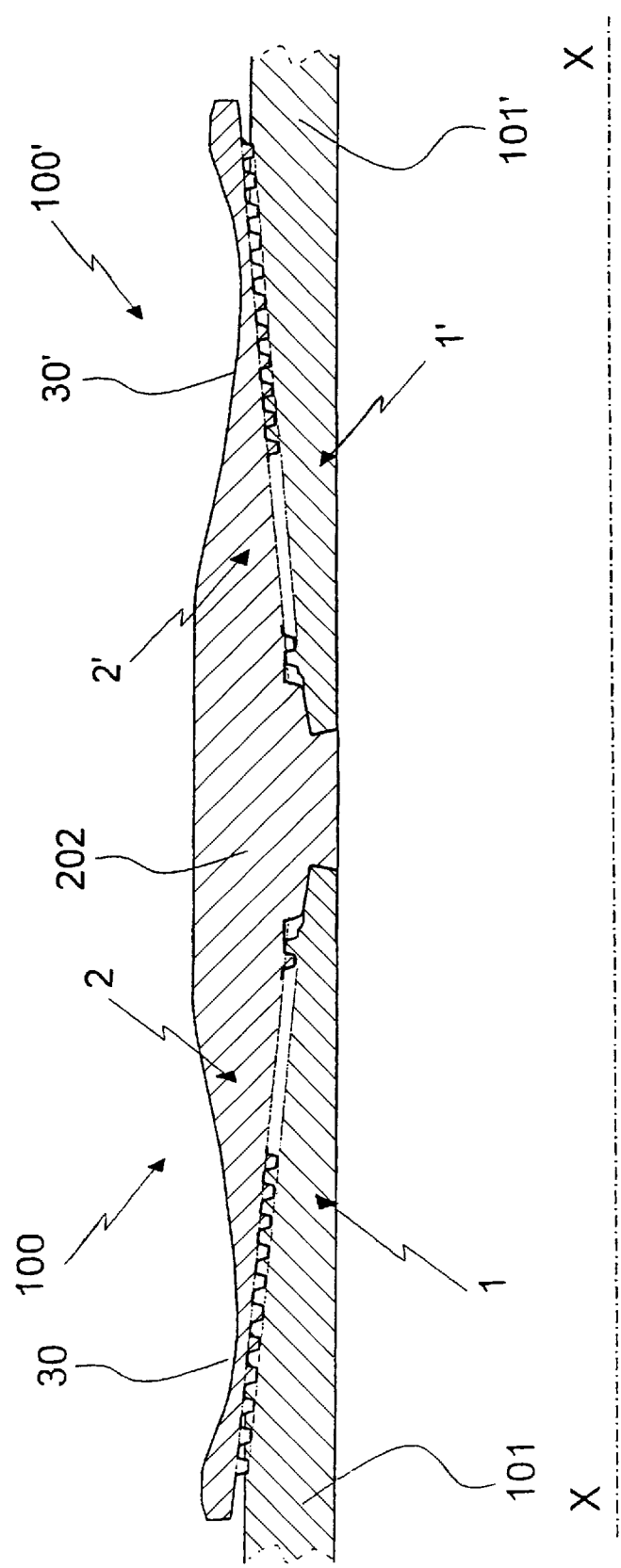

FIG. 6 shows a threaded and coupled connection constituted by two threaded tubular connections 100, 100'.

Male threaded elements 1, 1' are formed at the end of great length pipes.

Female threaded elements 2, 2' are formed symmetrically on a pipe coupling 202 which can be considered to be a very short pipe.

Each threaded connection 100, 100' is identical to that of FIG. 3.

This type of known connection needs no further commentary.

The function of grooves 30, 30' on coupling 202 is identical to that of groove 30 in female threaded element 2 of FIGS. 1 and 3.

We have sought to estimate the gain in the value of the maximum stress $\sigma_{max}$ in the junction radius between load flank 13 and thread root 19 of the last male engaging threads which are the most highly loaded of a threaded tubular connection of the type shown in FIG. 3 compared to the same threads of a prior art threaded connection without a groove.

Considering fatigue behavior data, it is estimated that the gain in the maximum stress $\sigma_{max}$ due to the groove is of the order of 20% on the threads, meaning a very substantial increase in the fatigue operational life.

The present invention also encompasses embodiments which can reduce the stiffness of the wall beneath the threading at the level of the first engaging threads in a manner equivalent to the groove described here in detail.

The present invention also encompasses embodiments where the means for reducing the stiffness of the wall beneath the threading at the level of the first engaging threads is not solely constituted by a groove.

Figure 7:
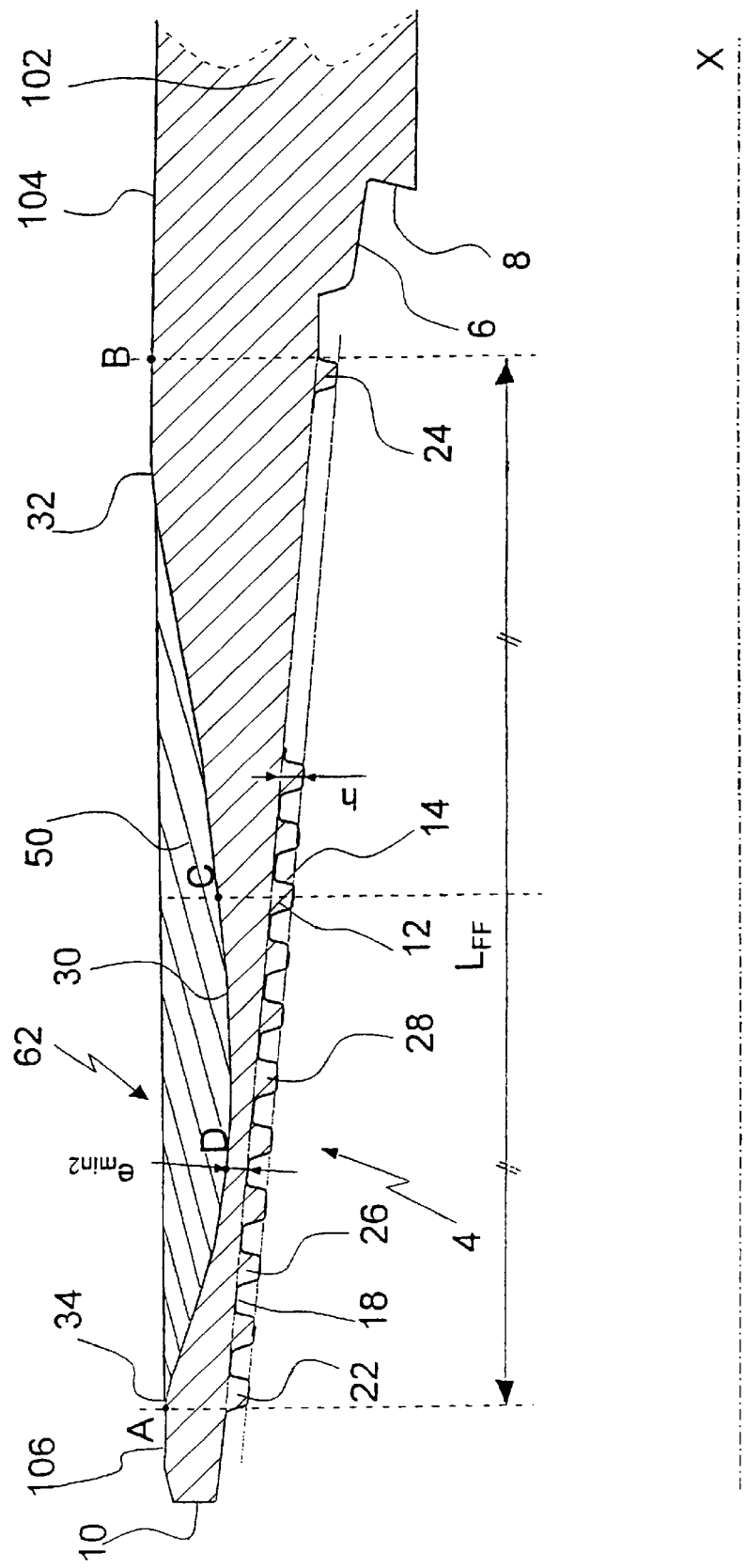

As shown in FIG. 7, for example, groove 30 can thus be partially or completely filled by a material 50 with an elastic modulus which is lower than that of the threaded tubular element 62. This material 50 can in particular be adhered to the surface of the groove and can, for example, be formed from a synthetic material.

The present invention also encompasses embodiments of threaded elements in which the threading comprises several distinct threaded portions.

In this case, the claims of the present invention have to be interpreted with the meaning that the groove is formed at least beneath the threaded portion where the flexibility of the first threads would be most reduced if there were no groove and would lead to the risk of initiating fatigue cracks.

In a variation of this case, the groove can be formed beneath each threaded portion so as to increase the flexibility of the first engaging threads of each threaded portion.

What is claimed is:

1. A threaded male or female tubular element with an anti-fatigue profile for a threaded tubular connection capable of resisting both static and cyclic stresses, formed at the end of a pipe, comprising a male threading on its external peripheral surface or a female threading on its internal peripheral surface depending on whether the threaded element is of the male type or of the female type, said threaded tubular element comprising a waist in the form of a groove in the wall of the threaded element formed in correspondence with the threading starting from the peripheral surface of the threaded tubular element opposite that where the threading is formed without affecting the geometry of the threads of the threading, wherein the thickness of the wall beneath the threading is reduced by the groove at least at the level of the first engaging threads so as to reduce their stiffness and wherein at the level of the groove, the thickness of the wall beneath the threading is a minimum in a transverse plane located in the interval between the first engaging thread and the sixth engaging thread.

2. A threaded tubular element according to claim 1, wherein the groove starts beneath the first engaging thread.

3. A threaded tubular element according to claim 1, wherein the groove ends in an axial interval comprised between a cross section in the middle of the threading and a cross section situated at the level of the last engaging threads.

4. A threaded tubular element according to claim 1, wherein the minimum thickness of the wall beneath the threading is roughly equal to twice the thread height.

5. A threaded tubular element according to claim 1, wherein the thickness of the wall beneath the threading is minimum and constant on a non-zero axial distance.

6. A threaded tubular element according to claim 1; wherein because of the groove, the thickness of the wall beneath the threading is in the range 100% to 120% of the minimum thickness of the wall beneath the threading in a zone termed the low stiffness zone disposed about the transverse plane of the minimum thickness of the wall beneath the threading, this low stiffness zone extending over an axial length greater than or equal to three times the thread pitch.

7. A threaded tubular element according to claim 1, wherein the groove profile is such that the critical cross section of the threaded element for tension stresses is situated outside the waist zone.

8. A threaded tubular element according to claim 1, wherein because of the groove, the thickness of the wall beneath the threading at the level of the last three engaging threads in the range 80% to 100% of the thickness of the wall beneath the threading in the non waist zone.

9. A threaded tubular element according to claim 1, wherein the groove has flanks the inclination of which with respect to the axis of the threaded tubular element is 45° or less.

10. a threaded tubular element according to claim 9, wherein the groove flank directed towards a free end side of the threaded element is globally more inclined with respect to the axis of the threaded element than the groove flank directed towards the opposite side.

11. A threaded tubular element according to claim 1, wherein the profile of the groove is a regular curve constituted by a series of arcs of a circle of finite or infinite radii tangentially joined to each other.

12. A threaded tubular element according to claim 1, wherein the groove joins to a non hollowed portion of the peripheral surface where the groove is formed via a tangential junction zone which is toric in shape.

13. A threaded tubular element according to claim 1, wherein the groove is partially or completely filled with a material with an elastic modulus which is lower than that of the threaded tubular element.

14. A threaded tubular element according to claim 1, wherein the threading has trapezoidal threads.

15. A threaded tubular element according to claim 1, wherein the thickness of the wall beneath the threading is a minimum in a transverse plane located between the second engaging thread and the sixth engaging thread.

16. A threaded tubular element according to claim 15, wherein the thickness of the wall beneath the threading is minimum and constant on a non-zero axial distance.

17. A tubular element according to claim 1, wherein the thickness of the wall beneath the threading is a minimum in a transverse plane located in the interval between the fourth engaging thread and the sixth engaging thread.

18. A threaded tubular element according to claim 17, wherein the thickness of the wall beneath the threading is minimum and constant on a non-zero axial distance.

19. A threaded tubular connection for resisting both static and cyclic stresses, comprising a male threaded tubular element at the end of a first pipe connected by screwing to a female threaded tubular element disposed at the end of a second pipe using a male threading on the male threaded tubular element and a female threading on the female threaded tubular element, wherein at least one of the two threaded tubular elements, male or female comprises a waist in the form of a groove, wherein at the level of the groove, the thickness of the wall beneath the threading is a minimum in a transverse plane located in the interval between the first engaging thread and the sixth engaging thread.

20. A threaded tubular connection according to claim 19, wherein the two threaded tubular elements, male or female, have trapezoidal threads.

21. A threaded male tubular element with an anti-fatigue profile for a threaded tubular connection capable of resisting both static and cyclic stresses, formed at the end of a pipe, comprising a male threading on its external peripheral surface, said threaded tubular element comprising a waist in the form of a groove in the wall of the threaded element formed in correspondence with the threading starting from the peripheral surface of the threaded tubular element opposite that where the threading is formed without affecting the geometry of the threads of the threading, wherein the thickness of the wall beneath the threading is reduced by the groove at least at the level of the first engaging threads so as to reduce their stiffness.

22. A threaded tubular element according to claim 21, wherein the thickness of the wall beneath the threading is a minimum in a transverse plane located between the second engaging thread and the sixth engaging thread.

23. A threaded tubular element according to claim 22, wherein the thickness of the wall beneath the threading is minimum and constant on a non-zero axial distance.

24. A threaded female tubular element with an anti-fatigue profile for a threaded tubular connection capable of resisting both static and cyclic stresses, formed at the end of a pipe, comprising a female threading on its internal peripheral surface, said threaded tubular element comprising a waist in the form of a groove in the wall of the threaded element formed in correspondence with the threading starting from the peripheral surface of the threaded tubular element opposite that where the threading is formed without affecting the geometry of the threads of the threading, wherein the thickness of the wall beneath the threading is reduced by the groove at least at the level of the first engaging threads so as to reduce their stiffness, and wherein at the level of the groove, the thickness of the wall beneath the threading is a minimum in a transverse plane located at or beyond the fourth engaging thread.

25. A tubular element according to claim 24, wherein the thickness of the wall beneath the threading is a minimum in a transverse plane located in the interval between the fourth engaging thread and the sixth engaging thread.

26. A threaded tubular element according to claim 25, wherein the thickness of the wall beneath the threading is minimum and constant on a non-zero axial distance.

* * * * *